(12) United States Patent
Lin

(10) Patent No.: US 6,985,416 B1
(45) Date of Patent: Jan. 10, 2006

(54) BUFFER OPTIMIZATION FOR SIMULTANEOUS ENCODING-DECODING AND PAUSE-CATCH-UP FOR REAL TIME DVD RECORDER

(75) Inventor: Shu Lin, Indianapolis, IN (US)

(73) Assignee: Thomson Licensing S.A., Boulogne-Billancourt (FR)

( * ) Notice: Subject to any disclaimer, the term of this patent is extended or adjusted under 35 U.S.C. 154(b) by 570 days.

(21) Appl. No.: 10/130,014

(22) PCT Filed: Nov. 2, 2000

(86) PCT No.: PCT/US00/30214

§ 371 (c)(1),
(2), (4) Date: Oct. 3, 2002

(87) PCT Pub. No.: WO01/35405

PCT Pub. Date: May 17, 2001

Related U.S. Application Data

(60) Provisional application No. 60/164,791, filed on Nov. 10, 1999.

(51) Int. Cl.
*G11B 7/00* (2006.01)

(52) U.S. Cl. .................. 369/47.33; 369/30.23
(58) Field of Classification Search .......... 369/30.23, 369/47.33; 386/82, 91, 125, 126
See application file for complete search history.

(56) References Cited

U.S. PATENT DOCUMENTS

| | | | |
|---|---|---|---|
| 5,343,456 A * | 8/1994 | Maeda ............... | 369/47.33 |
| 5,436,875 A | 7/1995 | Shinada | |
| 5,586,093 A * | 12/1996 | Honda et al. ......... | 369/47.13 |
| 5,608,697 A * | 3/1997 | De Haan et al. ...... | 369/47.33 |
| 5,701,383 A | 12/1997 | Russo et al. | |
| 5,774,186 A | 6/1998 | Brodsky et al. | |
| 5,930,444 A | 7/1999 | Camhi et al. | |
| 6,091,883 A | 7/2000 | Artigalas et al. | |
| RE36,801 E | 8/2000 | Logan et al. | |
| 6,240,244 B1 * | 5/2001 | Ikeda .................. | 386/125 |
| 6,282,155 B1 * | 8/2001 | Takahashi et al. ...... | 369/30.23 |
| 6,587,641 B1 * | 7/2003 | Maehashi et al. ...... | 386/111 |
| 6,678,227 B1 * | 1/2004 | Kondo et al. ......... | 369/47.33 |
| 6,678,466 B2 * | 1/2004 | Yagi et al. ........... | 386/95 |
| 6,693,857 B1 * | 2/2004 | Willis ................ | 369/30.23 |

FOREIGN PATENT DOCUMENTS

| | | |
|---|---|---|
| EP | 798 722 A2 | 10/1997 |
| EP | 866 446 A2 | 9/1998 |
| EP | 905 692 A2 | 3/1999 |
| EP | 932 153 A2 | 7/1999 |
| EP | 971 348 A2 | 1/2000 |

* cited by examiner

Primary Examiner—W. R. Young
Assistant Examiner—Kyung D. Kim
(74) *Attorney, Agent, or Firm*—Joseph S. Tripoli; Harvey D. Fried; Jorge T. Villabon

(57) ABSTRACT

A method and system for optimizing performance of a read buffer and a write buffer in a disc media having a feature requiring apparently simultaneous reading and writing. The method includes alternately writing data to the disc media from the write buffer during a write time $t_W$ and reading data from the disc media to the read buffer during a read time $t_R$. The read time and the write time are generally separated by a jump time $t_J$. The write time is selectively controlled so that it is optimized in accordance with respect to the front end read speed, the decoding bit rate, the front end write speed of the recordable media device and the encoding bit rate.

8 Claims, 6 Drawing Sheets

$t_J$: JUMP TIME
$t_R$: READING TIME
$t_W$: WRITING TIME
$r_1$: FRONT-END READ SPEED
$r_2$: DECODING BIT-RATE
$r_3$: FRONT-END WRITE SPEED
$r_4$: ENCODING BIT-RATE
$n$: NTH CYCLE

BUFFER OPTIMIZATION FOR SIMULTANEOUS ENCODING-DECODING AND PAUSE-CATCH-UP FOR REAL TIME DVD RECORDER

This application claims the benefit under 35 U.S.C. § 365 of International Application PCT/US00/30214, filed Nov. 2, 2000, which claims the benefit of U.S. Provisional Application 60/164,791, filed Nov. 10, 1999.

BACKGROUND OF THE INVENTION

1. Technical Field

The inventive arrangements relate generally to methods and apparatus providing advanced operating features for audio only, video only and both video and audio programs recorded on disk media, for example recordable digital video disks, hard drives and magneto optical disks.

2. Description of the Related Art

Various devices have been developed to enable consumers to record video and/or audio programs for later presentation. Such devices include tape recorders, video cassette recorders, recordable compact discs, and most recently, recordable digital video discs (DVD). Hard drives and magneto optical discs have also been used.

A DVD that can be recorded on only once, and thereafter is essentially a DVD read only memory, is referred to by the acronym DVD-R. The acronym DVD-R is also used generally to refer to the write-once, or record-once, technology. Several formats are available for DVD's to be recorded on, erased and re-recorded; that is, overwritten or rewritten. These are referred to by the acronyms DVD-RAM, DVD-RW and DVD+RW. As of this time no uniform industry standard has been adopted. The acronyms DVD-RAM, DVD-RW and DVD+RW are also used generally to refer to the respective rewritable technologies. Reference herein to rewritable DVD technology, devices and methods is generally intended to encompass all of the standards which are now being used, as well as those which may be developed in the future.

Although rewritable DVD technology is generally available, operation is limited to such basic functions as play, record, fast forward reverse and stop. Pause is available, but only as a counterpart to pause operation in a VCR, for example interrupting the play back of a prerecorded program or interrupting the recording of a viewed program to eliminate commercials from the recording. Unlike computer hard drives, recordable DVD devices have a very significant additional function, which is playing back prerecorded DVD's. Thus, there is an economic incentive to develop rewritable DVD technology, including methods and devices, that can be used instead of a computer hard drive. It is a challenge to provide such devices with improved, advantageous features without compromising the goal of decreasing costs and increasing sales.

A number of new features for rewritable disk media, for example DVD, include pause, catch-up and instant replay. These features require apparently simultaneous reading and writing. These features require that operation of the write buffer (also referred to as the record buffer) and the read buffer (also referred to as the track or play buffer) be optimized to avoid write buffer overflow read buffer underflow. Write buffer overflow results in a loss of program material after encoding and before writing onto the disk. Read buffer underflow results in an interruption of the program material as it is being played back. Catch-up modes, play-skip modes and smooth-catch-up modes or combinations of them all require such buffer optimization.

Pause, instant replay, catch-up, and all other trick modes are good features for DVD recorders, such as DVD-RW, DVD-RAM, DVD+RW just name a few. Here, pause is used to pause a broadcast TV program. Instant replay allows people to watch the recording instantly. Catch-up allows people to catch up the program after unpause or other implementations of trick modes. Trick modes include fast reverse, slow reverse, fast forward, slow forward, skip, and jump. All these features are very hard to implement on a DVD recorder for simultaneous encoding and decoding. It not only requires a fast front-end, but also needs a good strategy to manipulate the buffers in order to do seamless playback without loss of any data.

SUMMARY OF THE INVENTION

The invention concerns a method for optimizing performance of a read buffer and a write buffer in a disc media device having a feature requiring apparently simultaneous reading and writing. In such systems data is continuously added to the write buffer as new video programming is received. Further, video data is continuously depleted from the read buffer as pictures are displayed for a viewer.

The method includes alternately writing data to the disc media from the write buffer during a write time $t_W$ and reading data from the disc media to the read buffer during a read time $t_R$. The read time and the write time are generally separated by a jump time $t_J$. The write time is selectively controlled so that it is approximately equal to $2\ r_1\ r_4\ t_J/(r_1\ r_3 - r_1\ r_4 - r_2\ r_3)$. In the equation, $r_1$ is the front end read speed of the DVD recorder/player device, $r_2$ is the decoding bit rate, $r_3$ is the front end write speed of the recordable media device and $r_4$ is the encoding bit rate. According to one aspect, the method can also advantageously include selectively controlling the read time so that it is approximately equal to $2\ r_2\ r_3\ t_J/(r_1\ r_3 - r_1\ r_4 - r_2\ r_3)$.

According to another aspect of the invention, the read buffer size $B_{RSZ}$ is selected to be approximately equal to $(r_1 - r_2)^* t_R$ and the write buffer size $B_{WSZ}$ is selected to be approximately equal to $r_4^*(t_R + 2^* t_J)$.

According to an alternative embodiment, the invention concerns a recordable disc media device having a read buffer and a write buffer for implementing a feature requiring apparently simultaneous reading and writing where data is continuously added to the write buffer and continuously depleted from the read buffer. Suitable disc media player/recorder circuitry is provided for alternately writing data to the disc media from the write buffer during a write time $t_W$ and reading data from the disc media to the read buffer during a read time $t_R$. The read time and the write time are separated by a jump time $t_J$. A device controller is provided for selectively controlling the write time so that it is approximately equal to $2\ r_1\ r_4\ t_J/(r_1\ r_3 - r_1\ r_4 - r_2\ r_3)$, where the variables are as described above. According to a preferred embodiment, the device controller also selectively controls the read time so that it is approximately equal to $2\ r_2\ r_3\ t_J/(r_1\ r_3 - r_1\ r_4 - r_2\ r_3)$.

According to another aspect of the invention, the read buffer size $B_{RSZ}$ is selected to be approximately equal to $(r_1 - r_2)^* t_R$. Further, the write buffer size $B_{WSZ}$ is selected to be approximately equal to $r_4^*(t_R + 2^* t_J)$.

DETAILED DESCRIPTION OF THE PREFERRED EMBODIMENTS

Recordable DVD Device

Figure 1:
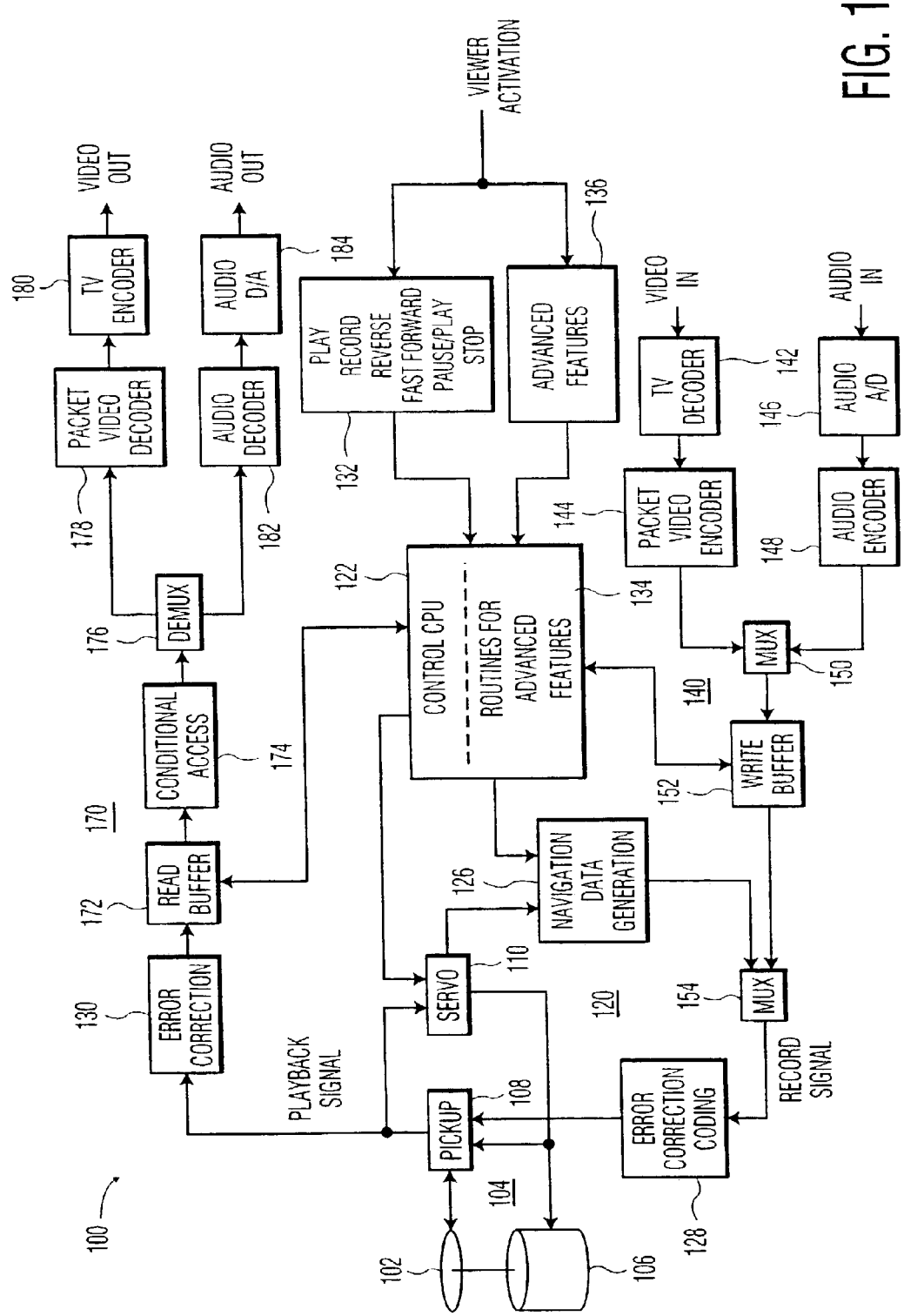
FIG. 1 is a block diagram of a rewritable DVD device that can be provided with one or more advance operating features in accordance with the inventive arrangements.

A device 100 for implementing the various advanced operating features in accordance with the inventive arrangements taught herein utilizes a rewritable disc medium 102 in accordance with the inventive arrangements is shown in block diagram form in FIG. 1. The rewritable disc medium 102 is embodied as a rewritable DVD in the illustrated embodiment. In many instances, as will be noted, the rewritable disc medium can also be, for example, a hard drive or a magneto optical disc (MOD). An example of a MOD is a mini-disc. In many instances, the inventive arrangements are applicable to video or audio or both video and audio.

The device 100 is capable of writing onto and reading from the disc medium, in this example, a rewritable DVD 102. The device comprises a mechanical assembly 104, a control section 120, a video/audio input processing path 140 and a video/audio output processing path 170. The allocation of most of the blocks to different sections or paths is self-evident, whereas the allocation of some of the blocks is made for purposes of convenience and is not critical to understanding the operation of the device.

The mechanical assembly 104 comprises a motor 106 for spinning the DVD 102 and a pickup assembly 108 that is adapted to be moved over the spinning disc. A laser on the pickup assembly burns spots onto a spiral track on the disc or illuminates spots already burned onto the track for recording and playing back video and/or audio program material. For purposes of understanding the invention, it is irrelevant whether the disc is recordable on one or two sides, or in the event of a double-sided recording, whether the double-sided recording, or subsequent reading from the disc, takes place from the same side of the disc or from both sides. The pickup and the motor are controlled by a servo 110. The servo 110 also receives the Playback Signal of data read from the spiral track of the disc 102 as a first input. The Playback Signal is also an input to an error correction circuit 130, which can be considered part of the control section or part of the video/audio output processing path.

The control section 120 comprises a control central processing unit (CPU) 122 and a navigation data generation circuit 126. The control CPU 122 supplies a first input signal to the navigation data generation circuit 126 and the servo 110 supplies a second input signal to the navigation data generation circuit 126. The servo can also be considered part of the control section. The navigation data generation circuit 126 supplies a first input signal to the multiplexer (MUX) 154, which forms part of the video/audio input processing path 140.

In conventional recordable DVD devices, the navigation data generation circuit 126 will generate conventional navigation packet data to be stored on the disc with the video data. In accordance with the inventive arrangements, the navigation data generation circuit can supply certain additional information for inclusion in the navigation packet. The additional information can be used for improved performance for selected trick mode playback operations as shall subsequently be described in more detail.

The output of the MUX 154 is an input to an error correction coding circuit 128. The output of the error correction coding circuit 128 is a recordable input signal supplied to the pickup 108, which will be "burned" onto the spiral track of the disc 102 by the laser.

The control CPU 122 also preferably has access to the data contained in the read buffer 172 and write buffer 152 as shown in FIG. 1. CPU 122 can delete, modify, and reformat video data stored in the read buffer 172 and write buffer 152. Control and data interfaces are also preferably provided for permitting CPU 122 to control the operation of packet video encoder 144 and audio encoder 148. Suitable software or firmware is provided in memory for the conventional operations performed by control CPU 122. In addition, program routines for the advanced features 134 are provided for controlling CPU 122 in accordance with the invention as shall hereinafter be described in greater detail.

A control buffer 132 for viewer activatable functions indicates those functions presently available, namely play, record, reverse, fast forward, slow play, pause/play and stop. The pause is a counterpart to pause operation in a VCR, for example manually interrupting the play back of a prerecorded program or interrupting the recording of a viewed program to eliminate commercials from the recording. A separate buffer 136 is provided to receive commands for implementing the inventive arrangements taught herein.

The video/audio input processing path 140 is a signal processing circuit for converting a conventional television signal, for example NTSC or PAL, into digitized packet data, for example MPEG-1 or MPEG-2, for digital recording by the device 100. The input path 140 comprises an NTSC decoder 142 and video encoder, for example MPEG-1 or MPEG-2, 144 for video in, and comprises an audio analog-to-digital converter (A/D) 146 and an audio encoder, for example MPEG-1 or MPEG-2, 148. The digitized signals are combined in a multiplexer 150 and stored in a write buffer 152 until an entire packet has been constructed. As groups of audio and video data packets are created, they are combined in MUX 154 with appropriate navigation packets generated in the navigation data generation block 126. The packets are then sent on to the error correction coding circuit 128. Error correction coding circuit 128 can also be deemed to be part of the input path 140.

As a practical matter, the smallest addressable unit on the spiral track of a DVD is an ECC (error correction code) block of 16 sectors, where each sector includes 2048 bytes of user data. A group is a number of ECC blocks, for example 12. Each group of blocks represents approximately 0.5 seconds of combined video and audio program material. The amount of linear space along the spiral track needed to record a group of ECC blocks, for example 192 sectors, is defined herein as a segment of the spiral track. Accordingly, it can appear that the write buffer needs to be only large enough to store one segment of data. One segment of data can correspond, for example, to approximately 0.5 seconds of audio and video program material.

The output processing path 170 comprises error correction block 130 and a read buffer, or output buffer, 172, in which data read from the disc is assembled into packets for further processing. The packets are processed by conditional access circuit 174 that controls propagation of the packets through demultiplexer 176 and into respective paths for video and audio processing. Accordingly, it can also appear that the read buffer 172 needs to be only large enough to store one segment of data, also corresponding to approximately 0.5 seconds of audio and video program material.

The video is decoded by decoder 178, for example from MPEG-1 or MPEG-2, and encoded as a conventional television signal, for example NTSC or PAL. The audio is decoded by circuit 182, for example from MPEG-1 or MPEG-2, and converted to analog form by audio digital-to-analog (D/A) converter 184. A PCI buffer 190 and PCI decoder 192 can be provided for decoding presentation control information contained in navigation packets contained on the disc. The output processing path 170 can be deemed to include the error correction circuit 130, as noted.

DSI buffer 186 is provided for receiving disc search information (DSI) contained within the navigation packets. The DSI decoder is used for decoding the DSI information contained within navigation packets which shall be described in more detail below.

Notably, the present invention can be realized in hardware, software, or a combination of hardware and software. Machine readable storage according to the present invention can be realized in a centralized fashion in one computer system, for example the control CPU 122, or in a distributed fashion where different elements are spread across several interconnected computer systems. Any kind of computer system or other apparatus adapted for carrying out the methods described herein is acceptable.

Specifically, although the present invention as described herein contemplates the control CPU 122 of FIG. 1, a typical combination of hardware and software could be a general purpose computer system with a computer program that, when being loaded and executed, controls the computer system and a DVD recording system similar to the control section 120 of FIG. 1 such that it carries out the methods described herein. The present invention can also be embedded in a computer program product which comprises all the features enabling the implementation of the methods described herein, and which when loaded in a computer system is able to carry out these methods.

A computer program in the present context can mean any expression, in any language, code or notation, of a set of instructions intended to cause a system having an information processing capability to perform a particular function either directly or after either or both of the following: (a) conversion to another language, code or notation; and (b) reproduction in a different material form. The invention disclosed herein can be a method embedded in a computer program which can be implemented by a programmer using commercially available development tools for operating systems compatible with the control CPU 122 described above.

DVD Media

Figure 2:
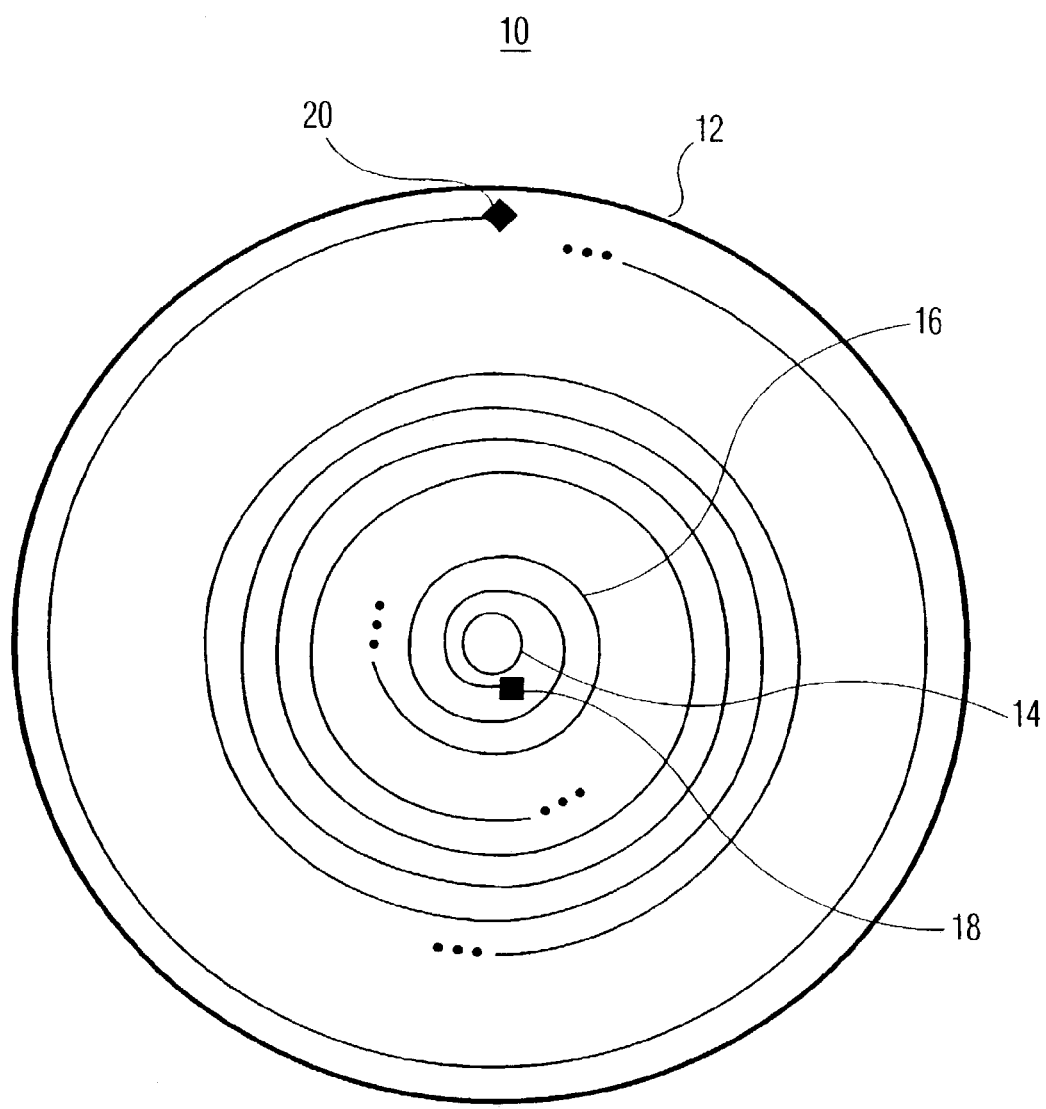
FIG. 2 is a diagram useful for illustrating the spiral track on a rewritable DVD.

For purposes of illustrating the inventive arrangements, program material can be recorded onto a rewritable DVD and played back from a rewritable DVD. A rewritable DVD 10 shown in FIG. 2 is suitable for use as disc 102 in device 100. The disc 10 is formed by a flat, round plastic plate-like member 12. The re-writable DVD can consist of two substrates bonded together by an adhesive layer forming a 1.2 mm thick disk. A center hole 14 can be formed in the disk so that a gripping device of the motor 106 of FIG. 1 can securely grip the disk and control the angular motion of the same in accordance with the inventive arrangements.

The direction of recording on the track is typically outwardly along a spiral track 16, from a smaller radius part of the spiral to a larger radius part of the spiral. The several series of three large dots (— — —) denote portions of the track not shown in the drawing. As a result, the beginning of the spiral track is deemed to be near the hole 14, and is denoted by square 18. The end of the spiral is deemed to end near the rim, and is denoted by diamond 20. Those skilled in the art generally accept defining the beginning and end of the spiral as noted. Certain advanced features in accordance with the inventive arrangements utilize backward recording, that is, from a larger radius part of the spiral to a smaller radius part of the spiral. The track can also have a side-to-side wobble, not shown in the drawing, to accommodate media type indexing. Due to difficulties of scale only portions of the track 16 are shown, and these are shown in greatly enlarged scale.

Each nearly circular, radially concentric section of the spiral is sometimes referred to as a track, but this terminology is not commonly accepted as having that specific meaning. In CD-ROM's, for example, the term track is also used to refer to that portion of the spiral track that contains a single audio song, or other selection, and the same may or may not become common for DVD's.

The inventive arrangements have been described herein relative to recordable DVD media. Those skilled in the art will appreciate, however, that the invention is not limited in this regard. Rather, the improvements to DVD navigation information for improved trick modes as described herein can be used with any type of disc media, including but not limited to DVD-R type media.

Buffer Optimization For Simultaneous Encoding and Decoding and Pause Catch-Up A method for managing buffers in accordance with the inventive arrangements optimizes the read buffer 172 and write buffer 152 to avoid unexpected buffer overflow and underflow. The method helps avoid problems that occur when the read and write speed of a DVD device front-end is not fast enough and/or the jump time is not short enough for simultaneous encoding and decoding needed for features such as pause, catch-up and instant replay. Catch-up modes, play-skip modes and smooth-catch-up modes or combinations of them all require such buffer optimization.

Figure 3:
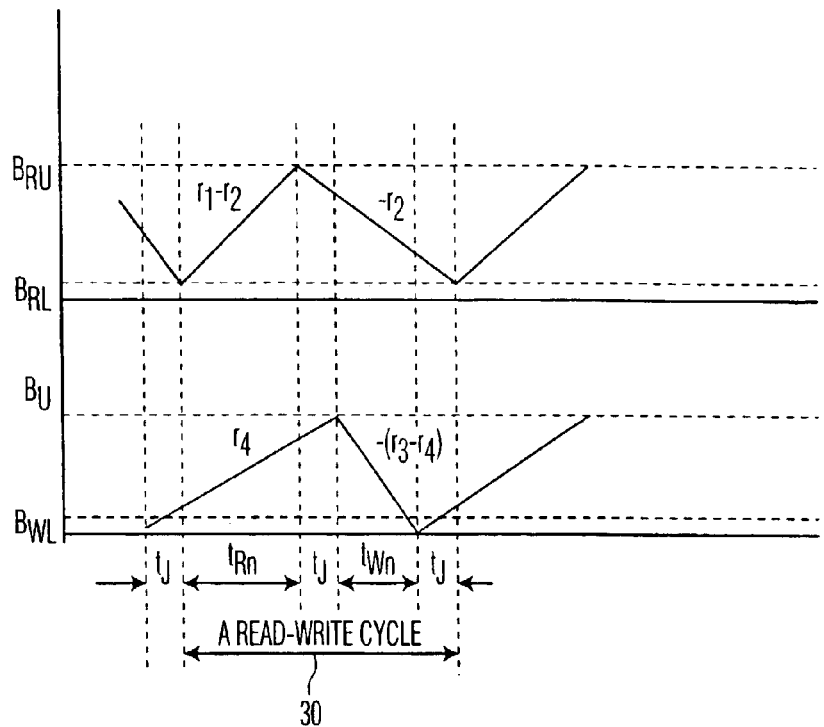
FIG. 3 is a buffer model which is useful for understanding the reading and writing process.
Figure 4A:
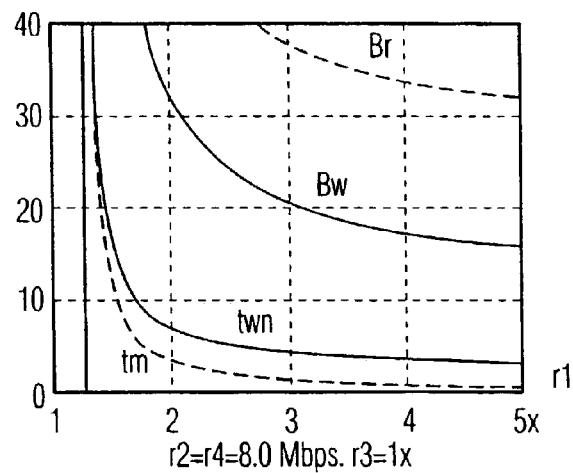
FIG. 4 illustrates the read time and write time for different DVD device front-end speeds.
Figure 4B:
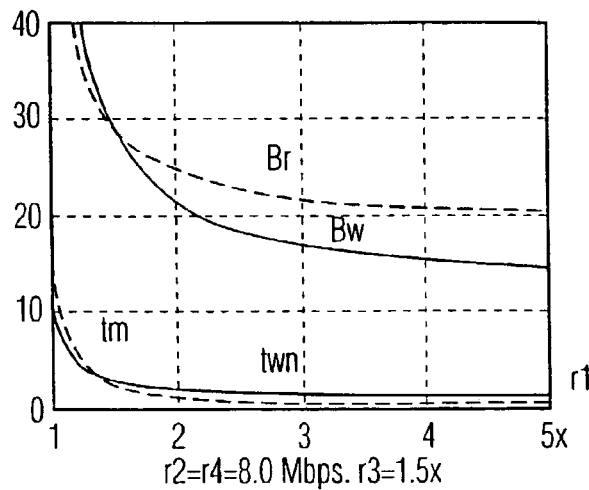
Figure 4C:
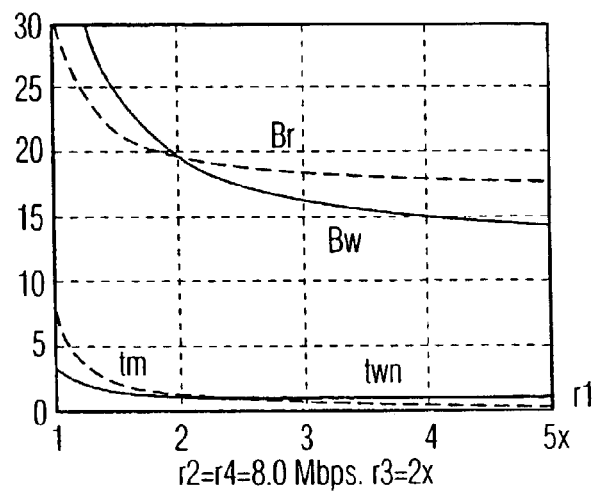
Figure 4D:
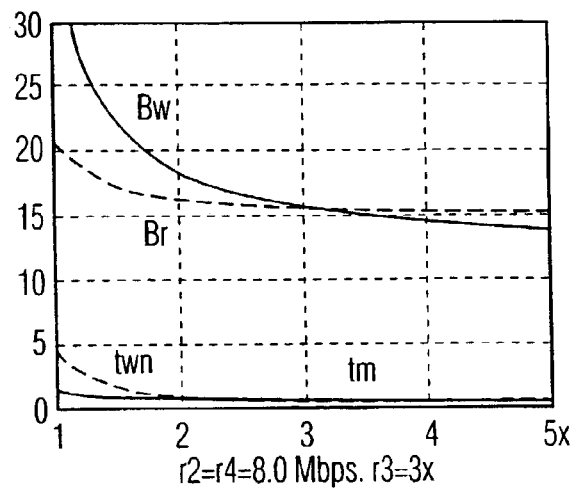

FIG. 3 is a buffer model drawing useful for describing the inventive arrangements as pertaining to read buffer 172 and write buffer 152. In FIG. 3, the variables are defined as follows:

$t_J$ is the jump time;
$t_R$ is the reading time;
$t_W$ is the writing time;
$r_1$ is the front end read speed;
$r_2$ is the decoding bit rate;
$r_3$ is the front end write speed;
$r_4$ is the encoding bit rate; and
n is the nth cycle.

In FIG. 3, the upper graph shows the operation of the read buffer and the lower graph shows the operation of the write buffer.

The DVD device front-end conventionally performs alternating cycles of reading and writing when operating in a pause, catch up, or instant replay mode. A read-write cycle 30 starts at read, and ends after the second jump. It includes read, jump, write and jump shown in FIG. 3. In a read-write cycle, the read buffer 172 data level increases from $B_{RL}$ to $B_{RU}$ when front-end reads data from disk in time $t_{Rn}$. During the reading time $t_{Rn}$, the incoming encoding data causes the data level of write buffer 152 to increase. After the front-end finishes reading during time $t_{Rn}$, it jumps during time $t_J$ to a different location on the disc to perform the writing operation during time $t_{Wn}$. As shown in FIG. 3, the read buffer level starts decreasing instantly as soon as the jump time $t_J$ begins.

The write buffer 152 reaches its peak level of data $B_{WU}$ just as jump time $t_J$ ends. To avoid loss of data, the write buffer 152 must not overflow, and it requires the buffer size $B_{WSZ}$ such that $B_{WSZ} > B_{WU}$. Also, the writing bit-rate must be greater than the maximum encoding bit-rate so that as the front-end writes during time $t_{Wn}$, the write buffer 152 data level begins to decrease. During the write time $t_{Wn}$, both buffer levels $B_R$ and $B_W$ decrease. The write buffer 152 may underflow if the front end exhausts the data stored in the write buffer. After the write time $t_{Wn}$, the front-end again jumps for reading during time $t_J$. This completes a read-write cycle 30.

At the end of read-write cycle 30, the read buffer goes to the lowest level, $B_{RL}$. For seamless play, $B_{RL}$ must be greater than zero. For variable bit-rate operation, because the instantaneous bit-rate is varying, the buffer increasing rates ($r_1-r_2$, $r_4$) and decreasing rates ($r_2$, $r_3-r_4$) may not be linear. In different read-write cycles $t_R$ and $t_W$ can be different, but they will never exceed an upper limit, the worst case. The model shown in FIG. 3 assumes the worst case. Both decoding and encoding bit-rates, $r_2$, $r_4$, are assumed to be maximum possible for the DVD device 100 and the front-end jump time is assumed to be a longest jump time which might be expected in a normal operation. Time $t_J$ is the total transit time for a front-end jumping from write to read, or from read to write.

From FIG. 3, in the nth read-write cycle, we have the following equations:

(a) Reading buffer level $B_R$:

$$B_R = (r_1 - r_2)^* t + B_{RL(n-1)} \text{ if } t \text{ is in } t_{Rn} \quad (1)$$

$$B_R = B_{RUn} - r_2^* t \text{ if } t \text{ is not in } t_{Rn} \quad (2)$$

where $$B_{RUn}|_{t=tRn} = (r_1 - r_2)^* t_{Rn} + B_{RL(n-1)} \quad (3)$$

$$B_{RLn}|_{t=tWn+2tJ} = B_{RUn} - r_2^*(twn + 2t_J) \quad (4)$$

For seamless play back, we need:

$$B_{RLn} \geq 0 \quad (5)$$

And to avoid overflow, the reading buffer size must be:

$$B_{RSZ} \geq B_{Run} \quad (6)$$

(b) Writing buffer level $B_W$:

$$B_W = r_4^* t + B_{WL(n-1)} \text{ if } t \text{ is in } t_{Wn} \quad (7)$$

$$B_W = B_{Wun} - (r_3 - r_4)^* t \text{ if } t \text{ is in } t_{Wn} \quad (8)$$

where $$B_{WUn}|_{t=tRn+2^*tJmax} = r_4^*(t_{Rn} + 2^* t_J) + B_{WL(n-1)} \quad (9)$$

$$B_{WLn}|_{t=tWn+2tJ} = B_{WUn} - (r_3 - r_4)^* t_{Wn} \quad (10)$$

For optimum:

$$B_{WLn} = 0$$

To avoid overflow, we must have writing buffer size:

$$B_{WSZ} \geq B_{Wun} \quad (11)$$

For worst case:
$B_{RL} = 0$
$B_{RSZ} = B_{Run}$
$B_{WSZ} = B_{Wun}$
Then:

$$B_{RSZ} = (r_1 - r_2)^* t_{Rn} \quad (12)$$

$$B_{RLn} = B_{RSZ} - r_2^*(t_{Wn} + 2t_J) \quad (13)$$

$$B_{WSZ} = r_4^*(t_{Rn} + 2^* t_J) \quad (14)$$

From above equations, the following equations can be derived:

$$(r_1 - r_2)^* t_{Rn} - r_2^*(t_{Wn} + 2^* t_J) = 0$$

$$r_4^*(t_{Rn} + 2^* t_J) - (r_3 - r_4) t_{Wn} = 0$$

Solving the above two equations results in:

$$t_{Wn} = 2 r_1 r_4 t_J / (r_1 r_3 - r_1 r_4 - r_2 r_3) \quad (15)$$

$$t_{Rn} = 2 r_2 r_3 t_J / (r_1 r_3 r_1 r_4 - r_2 r_3) \quad (16)$$

where $$r_1 r_3 - r_1 r_4 - r_2 r_3 > 0$$

Formulas (1) through (16) define the buffer model in accordance with the inventive arrangements.

The resulting values for buffer sizes, read time, and write time as determined by the foregoing formulas are optimal values in accordance with the inventive arrangements. In practice, it will be appreciated that component limitations, design considerations and other variables may result in actual values which differ somewhat from these optimal values. Accordingly, those skilled in the art will readily appreciated that it is not necessary to use the exact values indicated. In fact, preferred values can include variations of up to 20% from the optimal values which may be indicated by the formulas herein for buffer sizes, read time and write time.

As a first example, assume that the front-end read/write rate is 2×, the maximum bit rate of the bit stream is 7.0 Mb/sec, and the jump time, $t_J$, is 0.5 seconds. Then $$t_{Wn} = t_{Rn} 0.922 \text{ s}$$

and $$B_{RSZ} = 13.5 \text{ Mbits}$$

$$B_{WSZ} = 13.5 \text{ Mbits}$$

As a second example, assume that the front-end read/write speed is 2×/1.5×, the maximum bit rate of the bit stream is 6.0 Mb/sec and the jump time is 0.5 seconds. Then:

$$t_{Wn} = 1.1 \text{ s}$$

$$t_{Rn} = 0.8 \text{ s}$$

From (12) and (14):

$$B_{RSZ} = 16.6 \text{ Mbits}$$

$$B_{WSZ} = 11 \text{ Mbits}$$

FIG. 4 illustrates the read time and write time for different front-end speeds. The buffer size and time is shown in a graphically in a plot showing cycle vs. front-end speed for a jump time $t_J = 1$ second. If the jump time is not 1 second, the values of $t_R$, $t_W$, $B_r$ and $B_W$ are scaled by a factor of $t_J$. The unit of buffer size is Mbits.

Figure 5A:
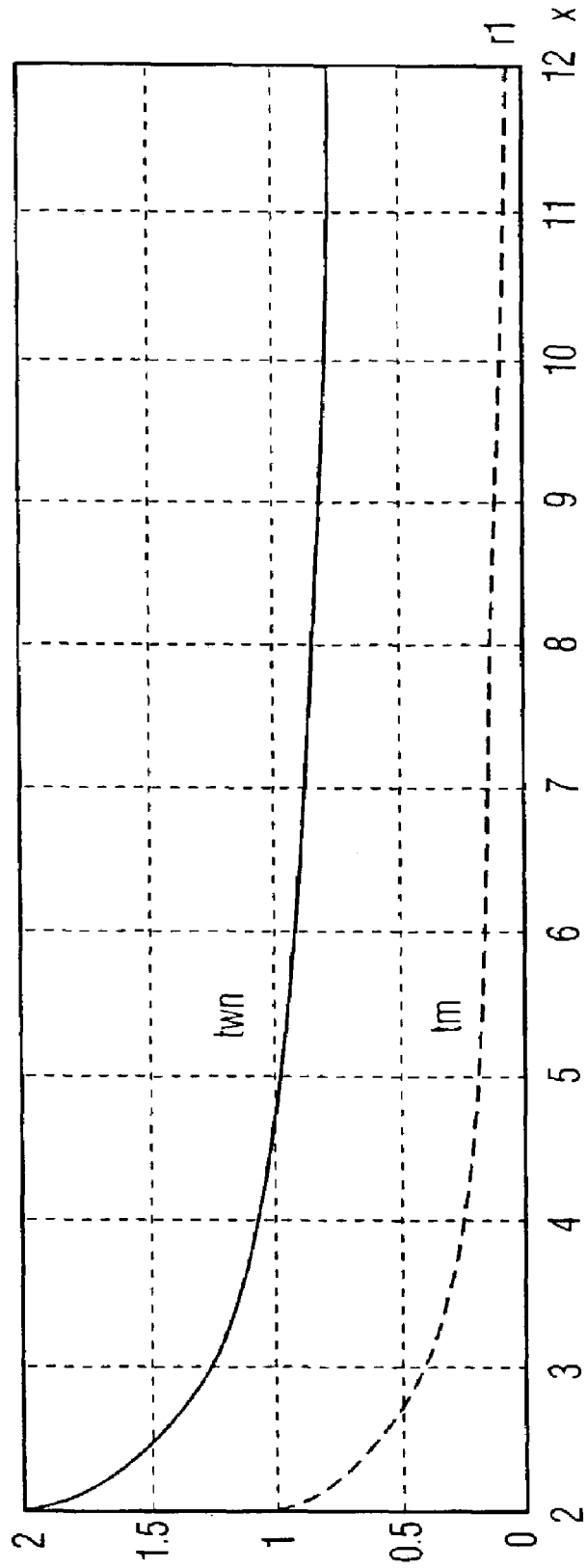
FIG. 5 is illustrates the read time and write time for a DVD device for selected parameters.
Figure 5B:
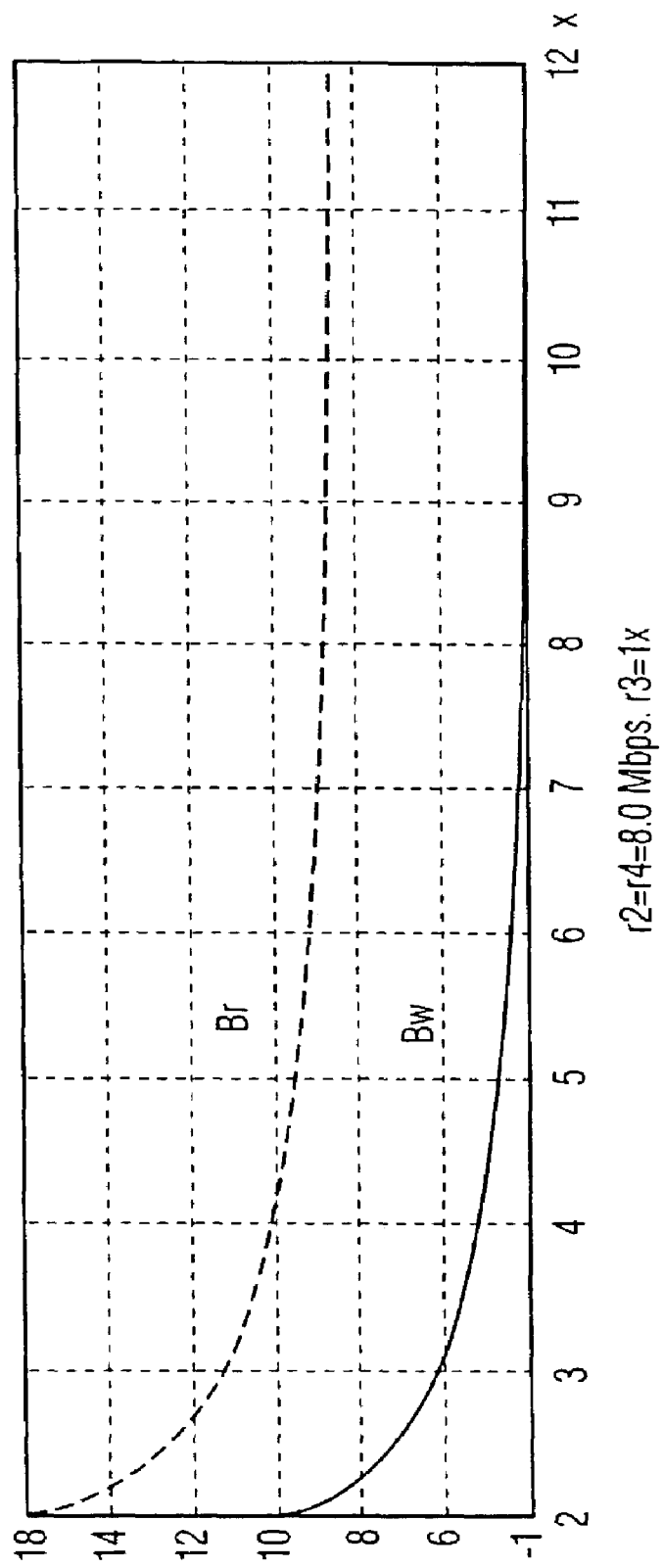

FIG. 5 is another example wherein the front-end write speed is 1×, the jump time is 0.3 s and the maximum bit-rate is 6.0 Mb/sec. Buffer sizes and the time of a cycle for reading and writing is shown vs. front-end reading speed. The plot shows the relationship between read time, write time, read buffer size, write buffer size and the front-end read speed.

What is claimed is:

1. A method for optimizing performance of a read buffer and a write buffer in a disc media device having a feature requiring apparently simultaneous reading and writing where data is continuously added to said write buffer and continuously depleted from said read buffer, said method comprising:

alternately writing data to said media from said write buffer during a write time $t_W$ and reading data from said disc media to said read buffer during a read time $t_R$, said read time and said write time separated by a jump time $t_J$, selectively controlling said write time so that it is approximately equal to $2\ r_1\ r_4\ t_J/(r_1\ r_3 - r_1\ r_4 - r_2\ r_3)$:

wherein $r_1$ is the front end read speed, $r_2$ is the decoding bit rate, $r_3$ is the front end write speed of said recordable media device and $r_4$ is the encoding bit rate.

2. The method according to claim 1 further comprising selectively controlling said read time so that it is approximately equal to $2\ r_2\ r_3\ t_J/(r_1\ r_3 - r_1\ r_4 - r_2\ r_3)$.

3. The method according to claim 1 wherein said read buffer size $B_{RSZ}$ is selected to be approximately equal to $(r_1 - r_2)^* t_R$.

4. The method according to claim 1 wherein said write buffer size $B_{WSZ}$ is selected to be approximately equal to $r_4^*(t_R + 2^* t_J)$.

5. A recordable disc media device having a read buffer and a write buffer for implementing a feature requiring apparently simultaneous reading and writing where data is continuously added to said write buffer and continuously depleted from said read buffer, comprising:

means for alternately writing data to said media from said write buffer during a write time $t_W$ and reading data from said disc media to said read buffer during a read time $t_R$, said read time and said write time separated by a jump time $t_J$, a device controller for selectively controlling said write time so that it is approximately equal to $2\ r_1\ r_4\ t_J/(r_1\ r_3 - r_1\ r_4 - r_2\ r_3)$;

wherein $r_1$ is the front end read speed, $r_2$ is the decoding bit rate, $r_3$ is the front end write speed of said recordable media device and $r_4$ is the encoding bit rate.

6. The device according to claim 5 wherein said device controller selectively controls said read time so that it is approximately equal to $2\ r_2\ r_3\ t_J/(r_1\ r_3 - r_1\ r_4 - r_2\ r_3)$.

7. The device according to claim 5 wherein said read buffer size $B_{RSZ}$ is selected to be approximately equal to $(r_1 - r_2)^* t_R$.

8. The device according to claim 5 wherein said write buffer size $B_{WSZ}$ is selected to be approximately equal to $r_4^*(t_R + 2^* t_J)$.

* * * * *